United States Patent
Dow et al.

(10) Patent No.: US 9,753,757 B2
(45) Date of Patent: *Sep. 5, 2017

(54) MACHINE LEARNING FOR VIRTUAL MACHINE MIGRATION PLAN GENERATION

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/841,803

(22) Filed: Sep. 1, 2015

(65) Prior Publication Data

US 2016/0314014 A1    Oct. 27, 2016

Related U.S. Application Data

(63) Continuation of application No. 14/694,011, filed on Apr. 23, 2015.

(51) Int. Cl.
*G06F 9/455* (2006.01)
*G06N 99/00* (2010.01)

(52) U.S. Cl.
CPC ........ *G06F 9/45558* (2013.01); *G06N 99/005* (2013.01); *G06F 2009/4557* (2013.01)

(58) Field of Classification Search
CPC ........ G06F 9/45558; G06F 2009/4557; G06N 99/005

(Continued)

(56) References Cited

U.S. PATENT DOCUMENTS 7,761,401 B2 * 7/2010 Dorai ............... H04L 67/325
706/45
8,180,298 B2 * 5/2012 Drude ............... H04W 88/06
455/41.2

(Continued)

OTHER PUBLICATIONS

Bari et al., "CQNCR: Optimal VM Migration Planning in Cloud Data Centers," 2014 IFIP Networking Conference, Jun. 2-4, 2014.*

(Continued)

*Primary Examiner* — Qing Chen
*Assistant Examiner* — Andrew M Lyons
(74) *Attorney, Agent, or Firm* — Cantor Colburn LLP; Steven Chiu

(57) ABSTRACT

Embodiments relate to generating a virtual machine (VM) migration plan. A method includes determining an initial mapping of VMs to hosts as an origin state and a final mapping of VMs to hosts as a goal state. Candidate paths are generated from the initial mapping to the final mapping. The candidate paths are evaluated based on a heuristic state transition cost from the origin state through intermediate states to the goal state by recursively obtaining a list of transitions that a parent state underwent. A heuristic goal cost is identified to reach the goal state from the intermediate states based on a fewest number of VM movements. The VM migration plan is generated based on the heuristic state transition cost of the candidate paths in combination with the heuristic goal cost of a sequence of transitions from the origin state to the goal state having a lowest total cost.

17 Claims, 7 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 8,185,894 | B1* | 5/2012 | Watson | G06F 9/485 |
| | | | | 718/1 |
| 8,370,473 | B2* | 2/2013 | Glikson | G06F 9/4856 |
| | | | | 709/223 |
| 8,880,477 | B2* | 11/2014 | Barker | G06F 9/5088 |
| | | | | 707/649 |
| 9,052,938 | B1* | 6/2015 | Bhide | G06F 9/45533 |
| 9,336,042 | B1* | 5/2016 | Brenneman | H04L 41/0813 |
| 9,438,466 | B1* | 9/2016 | O'Gorman | H04L 29/06 |
| 2005/0267885 | A1* | 12/2005 | Klier | G06F 17/2211 |
| 2007/0266383 | A1* | 11/2007 | White | G06F 9/4856 |
| | | | | 718/1 |
| 2009/0070771 | A1* | 3/2009 | Yuyitung | G06Q 10/06 |
| | | | | 718/105 |
| 2009/0300173 | A1* | 12/2009 | Bakman | G06F 11/008 |
| | | | | 709/224 |
| 2010/0100879 | A1* | 4/2010 | Katiyar | G06F 8/20 |
| | | | | 718/1 |
| 2011/0161491 | A1* | 6/2011 | Sekiguchi | G06F 9/4856 |
| | | | | 709/224 |
| 2011/0161859 | A1* | 6/2011 | Zhang | G06F 3/018 |
| | | | | 715/773 |
| 2012/0042311 | A1* | 2/2012 | Biran | G06F 9/45558 |
| | | | | 718/1 |
| 2012/0054731 | A1* | 3/2012 | Aravamudan | G06F 8/63 |
| | | | | 717/170 |
| 2012/0137285 | A1* | 5/2012 | Glikson | G06F 9/5077 |
| | | | | 718/1 |
| 2012/0284710 | A1* | 11/2012 | Vinberg | G06F 9/45533 |
| | | | | 718/1 |
| 2012/0297307 | A1* | 11/2012 | Rider | G06F 11/3433 |
| | | | | 715/736 |
| 2012/0324112 | A1* | 12/2012 | Dow | G06F 9/5077 |
| | | | | 709/226 |
| 2013/0339956 | A1* | 12/2013 | Murase | G06F 9/505 |
| | | | | 718/1 |
| 2013/0346619 | A1* | 12/2013 | Panuganty | H04L 41/12 |
| | | | | 709/226 |
| 2014/0215073 | A1* | 7/2014 | Dow | H04L 67/10 |
| | | | | 709/226 |
| 2015/0089010 | A1* | 3/2015 | Tsirkin | G06F 12/126 |
| | | | | 709/212 |
| 2016/0034362 | A1* | 2/2016 | Al-Wahabi | G06F 11/203 |
| | | | | 714/4.1 |

OTHER PUBLICATIONS

Lester, Patrick, "A* Pathfinding for Beginners," Jul. 18, 2005, last retrieved from www.policyalmanac.org/games/aStarTutorial.htm on Jan. 22, 2017.*

Wikipedia, "A* search algorithm," Mar. 1, 2015, last retrieved from https://en.wikipedia.org/w/index.php?title=A*_search_algorithm &oldid=649438130 on Jan. 22, 2017.*

Akoush et al., "Predicting the Performance of Virtual Machine Migration," 2010 IEEE International Symposium on Modeling, Analyzis & Simulation of Computer and Telecommunication Systems, Sep. 23, 2010.*

Al-Haj, Saeed and Al-Shaer, Ehab, "A Formal Approach for Virtual Machine Migration Planning," 9th International Conference on Network and Service Management, Jan. 30, 2014.*

Hu et al., "A Quantitative Study of Virtual Machine Live Migration," Proceedings of the 2013 ACM Cloud and Autonomic Computing Conference, 2013.*

Petrucci, Vinicius, "Thesis Proposal: Dynamic Optimization of Power and Performance for Virtualized Server Clusters," Sep. 2010, last retrieved from http://www2.ic.uff.br/~vpetrucci/proposal.pdf on Mar. 27, 2017.*

Wang et al., "A Decentralized Virtual Machine Migration Approach of Data Centers for Cloud Computing," Mathematical Problems in Engineering, 2013.*

Xu, Gaochao et al., "A Heuristic Location Selection Strategy of Virtual Machine Based on the Residual Load Factor," Journal of Computational Information Systems 9:18, 2013.*

Zhao et al., "A Heuristic Placement Selection of Live Virtual Machine Migration for Energy-Saving in Cloud Computing Environment," PLoS One, Sep. 24, 2014.*

List of IBM Patents or Patent Applications Treated as Related, Sep. 1, 2015, 2 pages.

U.S. Appl. No. 14/694,011, filed Apr. 23, 2015, Entitled: "Machine Learning for Virtual Machine Migration Plan Generation," First Named Inventor: Eli M. Dow.

List of IBM Patents or Patent Applications Treated as Related, Apr. 27, 2017, 2 pages.

U.S. Appl. No. 15/496,372, filed Apr. 25, 2017, Entitled: "Machine Learning for Virtual Machine Migration Plan Generation," First Named Inventor: Eli M. Dow.

* cited by examiner

MACHINE LEARNING FOR VIRTUAL MACHINE MIGRATION PLAN GENERATION

DOMESTIC PRIORITY

This application is a continuation of U.S. patent application Ser. No. 14/694,011 filed Apr. 23, 2015, the content of which is incorporated by reference herein in its entirety.

BACKGROUND

The present disclosure relates to management of virtual machines and, more specifically, using machine learning for virtual machine migration plan generation.

A contemporary virtual machine (VM) is a software implementation of a machine (i.e., a computer) that executes programs like a physical machine. The VM typically emulates a physical computing environment, but requests for central processing unit (CPU), memory, hard disk, network and other hardware resources are managed by a virtualization layer which translates these requests to the underlying physical hardware. VMs are created within a virtualization layer, such as a hypervisor or a virtualization platform that runs on top of a client or server operating system. The virtualization layer is typically used to create many individual, isolated VMs within a single, physical machine. Multiple VMs are typically used in server consolidation, where different services that were previously run on individual machines are instead run in isolated VMs on the same physical machine.

A persistent challenge to providers of cloud hosting and other network management services is the efficient use of system resources. Efficient allocation of VMs to different network nodes, e.g., network servers, is desired in order to maximize the use of network resources and reduce the number of physical servers and/or physical resources required to provide computing services to customers. Modern virtual machine management software seeks either consolidation of VMs for power savings or load-balancing for performance. While various methods for computing a better load-balanced or consolidated goal state exist, the process of determining a migration plan to get from the system's current state to the desired goal is particularly challenging, as a large number of intermediate states may be needed and some intermediate states may not be directly achievable due to a number of system constraints.

SUMMARY

According to an embodiment, a method for generating a virtual machine migration plan using machine learning is provided. The method includes determining an initial mapping of a plurality of virtual machines to a plurality of hosts as an origin state and determining a final mapping of the virtual machines to the hosts as a goal state. Candidate paths are generated to transition from the initial mapping to the final mapping. The candidate paths are evaluated based on a heuristic state transition cost to transition from state-to-state from the origin state through a plurality of intermediate states to the goal state by recursively obtaining a list of transitions that a parent state underwent to reach the parent state from the origin state. A heuristic goal cost is identified to reach the goal state from the intermediate states based on a fewest number of virtual machine movements. The virtual machine migration plan is generated based on the heuristic state transition cost of the candidate paths in combination with the heuristic goal cost of a sequence of transitions from the origin state to the goal state having a lowest total cost.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
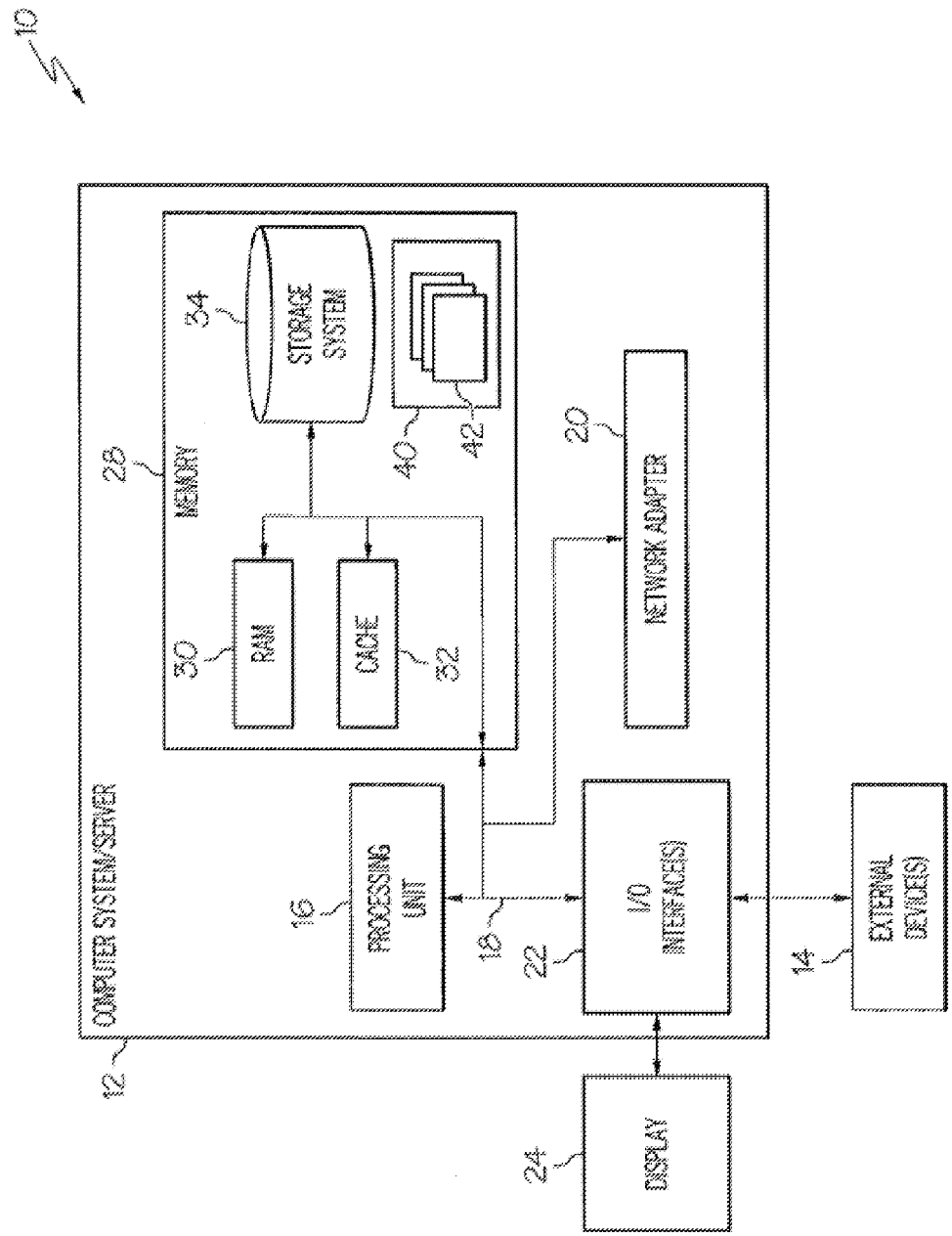
FIG. 1 depicts a cloud computing node according to an embodiment.

Exemplary embodiments relate to using machine learning for virtual machine (VM) migration plan generation. Embodiments can enforce both a colocation and an anti-colocation policy using colocation and anti-colocation contracts.

A VM migration plan can be created by processing a first mapping of VMs to hosts along with a second mapping of VMs to hosts. Pre-processing can be performed followed by machine search techniques with heuristics and pruning mechanisms to generate serialized optimal paths from the first state (i.e., an origin state) to a second state (i.e., a goal state). The serialized output can be further processed into a parallel plan that achieves faster convergence (i.e., time to achieve the goal state from the origin state) through live guest migration. The net result is that convergence time to an idealized virtual data center from an arbitrary virtualized data center is reduced drastically.

A naïve migration plan generation solution considers only the present mapping of VMs to hosts along with the idealized mapping of VMs to host. For instance, a loop may identify the original host for each VM and the idealized destination host for that same VM. In practice, simply begin executing migrations according to such a scheme is not possible. Constraints such as hypervisor low-memory conditions, VM:VM anti-colocation constraints, and VM:Host anti-colocation constraints quickly foil such schemes in anything beyond a trivial cloud computing environment.

What is needed is a method for finding a substantially optimal path from the current (origin) state to the optimized (goal) state according to a set of valid transition rules that must be enforced at each step along the way. In exemplary embodiments, a variation of an A-star (A*) search algorithm can be employed to generate a VM migration plan.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (SaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
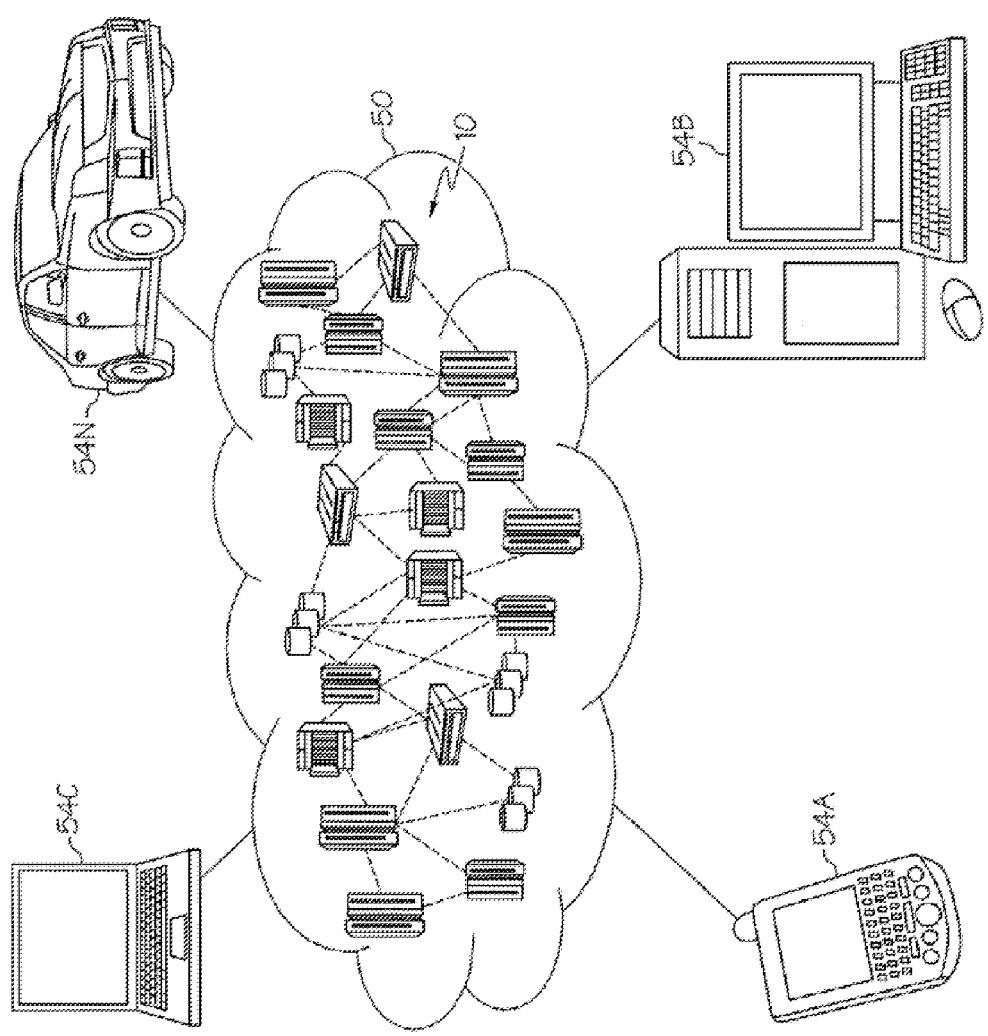
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
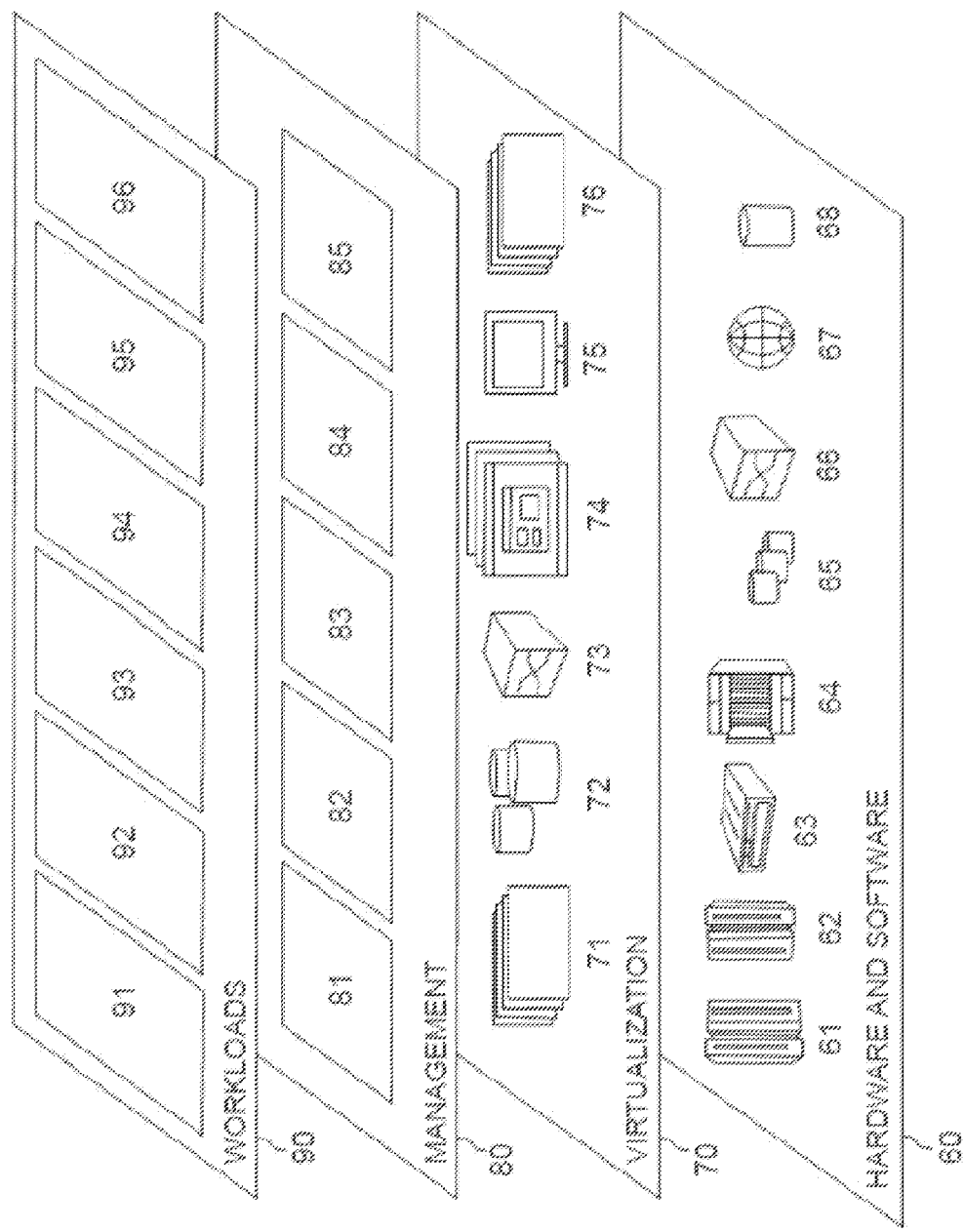
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; virtual clients 75; and a virtual machine allocation application 76. In an exemplary embodiment, an application, such as virtual machine allocation application 76 in the virtualization layer 70, may implement processes or methods for determining and/or performing virtual machine plan generation and allocations as described herein; however, it will be understood that the application 76 may be implemented in any layer.

In another example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
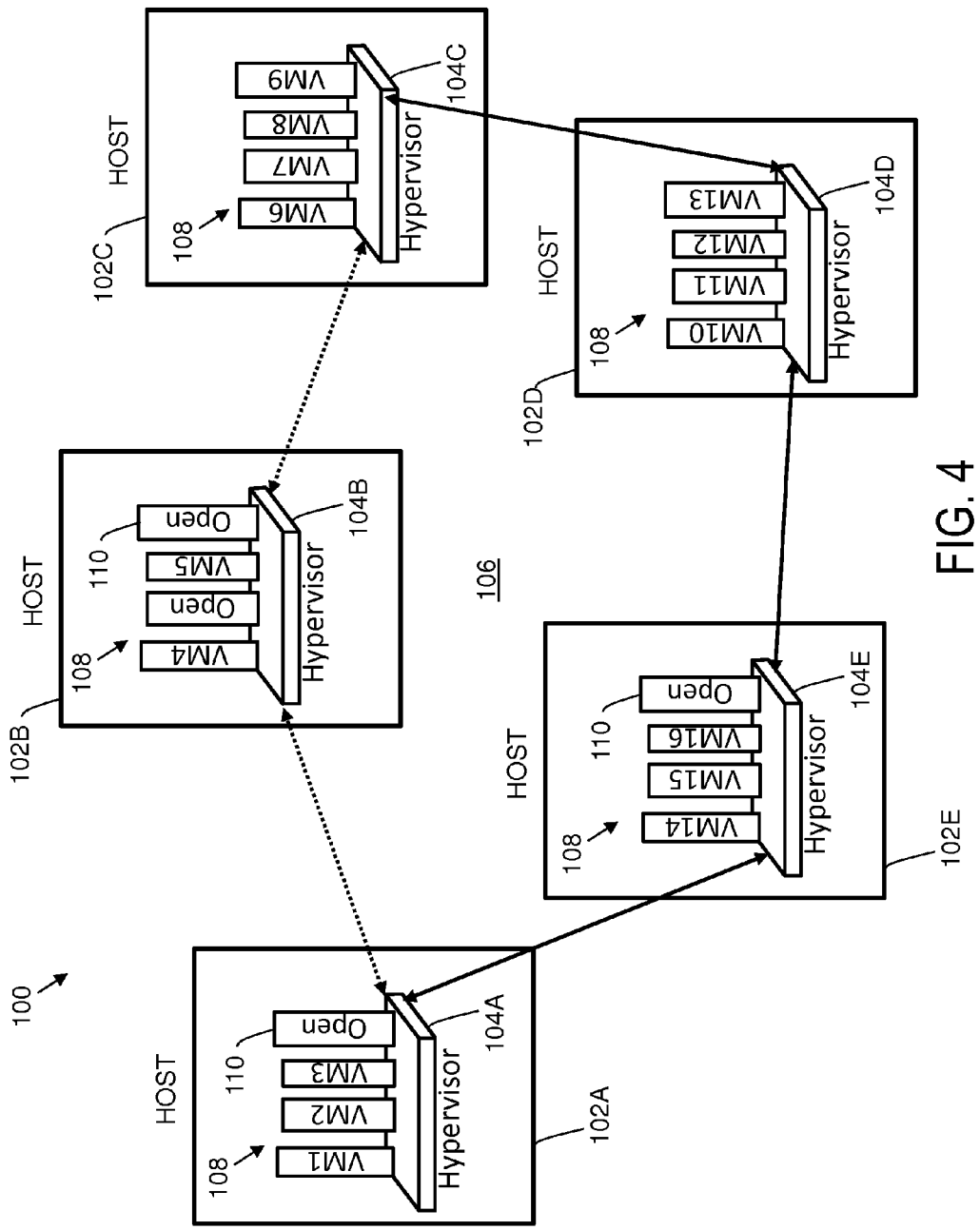
FIG. 4 depicts a block diagram of a virtual machine to host mapping where machine learning can be applied for virtual machine migration plan generation according to an embodiment.

The virtual machine allocation application 76 can implement machine learning to generate a virtual machine migration plan to efficiently migrate VMs between hosts based on a migration goal. FIG. 4 depicts a block diagram of a virtual machine to host mapping, where machine learning can be applied for virtual machine migration plan generation according to an embodiment. VM-to-host mapping 100 of FIG. 4 is a simplified example to illustrate several issues involved with performing VM migration. In the example of FIG. 4, hosts 102A, 102B, 102C, 102D, and 102E each include at least one respective hypervisor 104A, 104B, 104C, 104D, and 104E and communicate over a network 106. Movement of various virtual machines 108 between the hosts 102A-E can be constrained by a number of factors. In the example of FIG. 4, movement of VMs 108 is constrained such that each host 102A-E can support up to four VMs 108 and some hosts 102A-E are not directly reachable by all of the hosts 102A-E. For instance, host 102A can support VM migration with hosts 102B and 102E; host 102B can support VM migration with hosts 102A and 102C; host 102C can support VM migration with hosts 102B and 102D; and host 102D can support VM migration with hosts 102C and 102E.

In the VM-to-host mapping 100, host 102A includes VM1, VM2, VM3 and one open slot 110; host 102B includes VM4, VM5, and two open slots 110; host 102C includes VM6, VM7, VM8, VM9, and no open slots 110; host 102D includes VM10, VM11, VM12, VM13, and no open slots 110; and, host 102E includes VM14, VM15, VM16, and one open slot 110. Thus, if a goal is to migrate VM10 and VM11 from host 102D to host 102B, there are several options. For instance, VM10 and VM11 can be migrated sequentially via open slots 110 of hosts 102E and 102A. Alternatively, one or more of VM6-VM9 can be displaced from host 102C to create one or two open slots 110 on host 102C such that VM10 and VM11 can transition through host 102C to host 102B. As a further alternative, either VM10 or VM11 can transition through open slots 110 of host 102E and 102A while one of VM6-VM9 is displaced from host 102C such that the other of VM10 or VM11 can transition through host 102C to host 102B. It can be appreciated that when VM10 and VM11 take different paths to reach host 102B, at least a portion of the migration can be performed in parallel. For instance, after VM10 migrates to the open slot 110 of host 102E, VM6 can migrate to a newly created open slot 110 of host 102D where VM10 used to reside. VM10 and VM11 can both transition in parallel, where VM10 migrates to host 102A while VM11 migrates to host 102C, and both can migrate to host 102B at about the same time in parallel.

Figure 5:
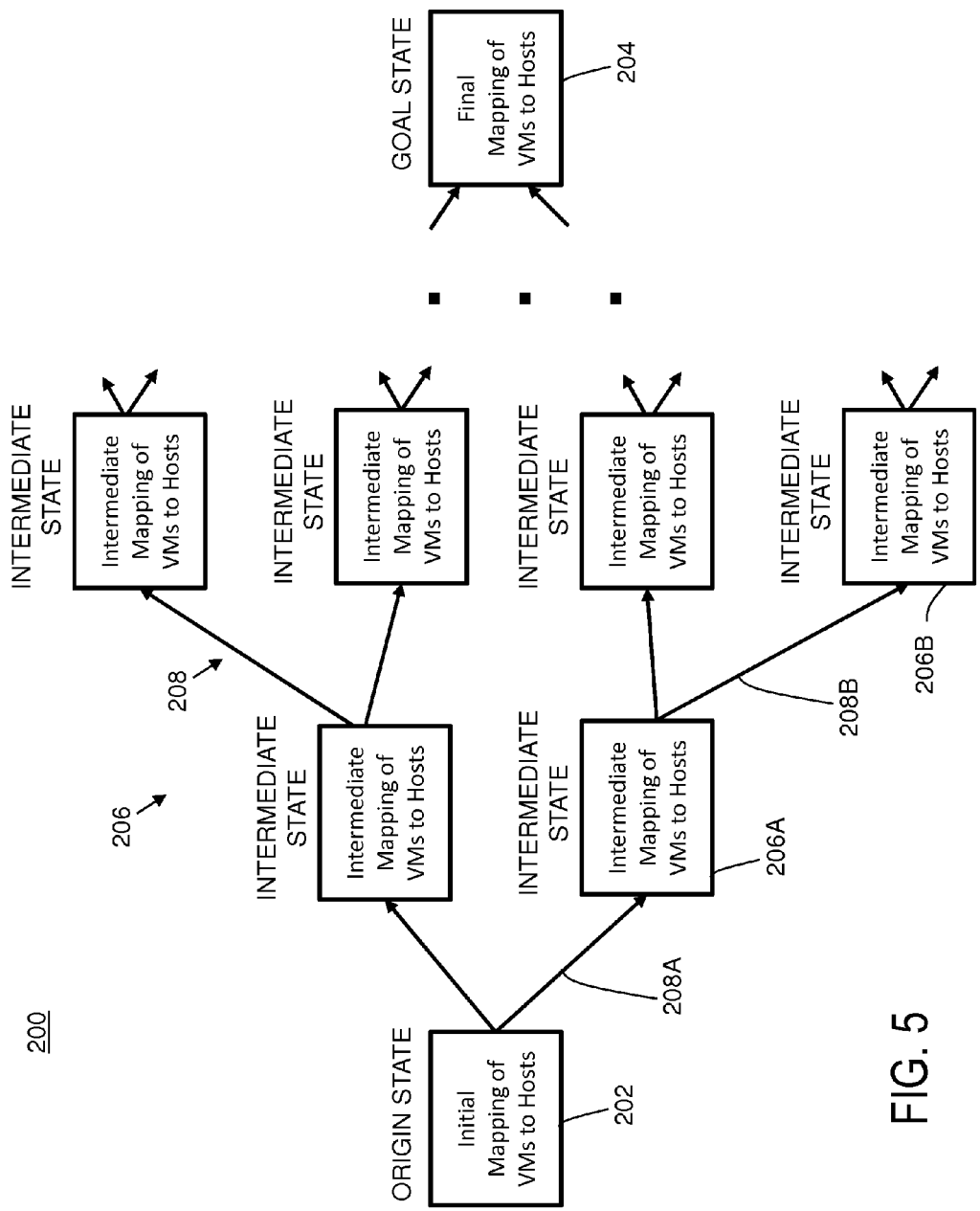
FIG. 5 depicts a block diagram of possible state transitions analyzed during machine learning to generate a virtual machine migration plan generation according to an embodiment.

Every time a VM 108 migrates, a new system state exists, where a system state can be defined as VM to host mappings. FIG. 5 depicts a block diagram of possible state transitions 200 analyzed during machine learning to generate a virtual machine migration plan generation according to an embodiment. An initial mapping of VMs to hosts is defined as an origin state 202. A final mapping of VMs to hosts is defined as a goal state 204. Candidate paths are formed from the origin state 202 through a plurality of intermediate states 206 to the goal state 204. A state may be referred to as a parent state if it is a transition state that occurs after the origin state 202. For example, intermediate state 206A is a parent state of origin state 202, and intermediate state 206B is a parent state of intermediate state 206A. A heuristic state transition cost 208 can be defined for each state-to-state transition. For example, heuristic state transition cost 208A can be defined as a cost to transition from origin state 202 to intermediate state 206A, while heuristic state transition cost 208B can be defined as a cost to transition from intermediate state 206A to intermediate state 206B. The analysis of state transitions and costs can be performed by the virtual machine allocation application 76 of FIG. 3 or another application running directly on physical hardware or in a virtualized environment.

The virtual machine allocation application 76 of FIG. 3 may also identify a heuristic goal cost to reach the goal state 204 from the intermediate states 206 based on a fewest number of virtual machine movements. For example, the migration of VM10 and VM11 from host 102D to host 102B in FIG. 4 may be accomplished using six or more VM movements depending on candidate path selecting for moving the VMs. It will be understood that this is a simplified example, and more typical environment can include dozens of VMs and hosts for consideration during VM migration.

In order to have an effective implementation of machine learning, such as A*, that produces a substantially optimal path from an origin state to a goal state, each candidate path can be evaluated according to a function $F(x)=H(x)+G(x)$. The definition of functions $H(x)$ and $G(x)$ is provided below.

The $H(x)$ function is a critical component of machine learning that codifies a heuristic cost of a transition from one state to another. This value is defines how the cost to reach any given state from the origin state is determined. Ideally, each state would be interrogated, asking for the sequence of moves used to obtain this state from the origin state, and assigning some cost to each transition along the way. To assign the individual cost to each transition, a number of enumerations of state transition types may be defined, such as:

PARTIAL TRANSITION TYPE—This is a move that places one or more VM onto the host where it ultimately belongs. This state transition may also be referred to as an intuitive move because it is what human players of a pen and paper simulation would be likely to try.

ENDGAME TRANSITION TYPE—This is a subtype of intuitive which happens to fully satisfy a host completely. In other words, it is an intuitive move whereby no migrations inbound or outbound from the recipient host are needed to achieve the resulting state for that host. The individual recipient host has achieved its local goal state.

COUNTERMOVEMENT TRANSITION TYPE—This is a move that takes a VM away from the host that it should ultimately reside on (when it is presently there). This move is the exact opposite of what human players on a pen and paper simulation would be likely to do, i.e., a counterintuitive movement.

INVALID TRANSITION TYPE—This is a move that results in an invalid state. This encapsulates any contractual obligation violations, identifies migrations, and resource restrictions.

PING-PONG TRANSITION TYPE—This is a move that results in a VM needlessly bounding back and forth across two hosts in immediate succession.

CYCLE TRANSITION TYPE—This is a move where a VM has cycled back to a host it was on previously that is not where it ultimately belongs. Note that a cycle is different than a ping-pong transition type because the return by some VM to a host it previously resided on is not immediate, it may be some number of other valid moves later. This scenario could happen if a VM needs to be moved temporarily (perhaps to make room for some other transient VM to pass through a host).

RANDOM TRANSITION TYPE—This is a move that is none of the above, it is a generally a form of shuffling of virtual machines that may be helpful or may ultimately be a dead end move.

The heuristic cost function for any given state S (the state being a mapping or allocation of VMs to hosts) can be denoted as H(S). To calculate H(S) for each state, a list of transitions that a parent state underwent is recursively obtained all the way back to the origin state. For each encountered transition, a fixed cost is assigned according to individual values associated with each enumerated transition type. Each of these individual costs is summed to determine H(S). Endgame transitions are assigned a cost of zero, and intuitive moves are assigned a lower cost than counter intuitive moves. Similarly, VM relocation cycles are given a moderate penalty by assigning a cost that is larger than the cost of random, yet valid, moves. Although "ping-pong" and "invalid" moves could be assigned large and infinite costs respectively, it should be appreciated by those skilled in the art that it is far better to never generate these states in the first place. This can be accomplished by early pruning when performing state expansion of an OPEN list. States that are "ping-pong" or "invalid" can be omitted without impacting correctness or optimality of the solution.

A second component to the implementation of machine learning based path finding is to identify a heuristic cost to reach the goal state from any arbitrary state, referred to as a heuristic goal cost. To establish optimality in the generated solution, the cost function must be less than or equal to the actual cost to reach the solution. In other words, if the heuristic goal cost function G(x) is admissible (meaning that it never overestimates the actual minimal cost of reaching the goal), then the machine learning algorithm is considered optimal. Thus, any attempts to estimate this heuristic value should be conservative.

In one embodiment, the heuristic is the fewest number of VM movements, in an ideal case with no co-location or resource restrictions, that would need to be moved to reach the goal state. The first step is to make a mapping data structure, such as a hash table, for each of the current and ideal VM to hardware mappings. Other examples of the mapping data structure include a set, a hash set, a map, a hash tree, an associative queue, or other associative data structure. In the example of a hash table, the hash keys are the host identifier, and values are a list of assigned virtual machine identifiers that reside on that host. This can be used to obtain efficient access to pairs of hosts from each of the ideal and present VM allocations. Once the mapping data structures are complete, a heuristic value can be computed through the assignment of a "distance" between the current and goal states on a per host basis. This can be accomplished by iterating over each hardware element involved to compute the number of virtual machines that are present in one state, but not the other. In essence, the "distance" is examined from the perspective of the present moving towards the goal state and symmetrically from the goal state seeking convergence with the initial state.

For each host, a value can be computed representing the count of those VMs which are in the current state, but not the ideal. The count of VMs which are not in the goal state but are present in the current state can also be computed. If either of the hosts involved is empty, the value of the total VM count is assigned on the same host in the other state. For example, if the goal state has a non-empty VM allocation with N virtual machines allocated, and the present state has an empty host with no virtual machines allocated, a value of N is assigned as the distance. To complete the calculation, the minimum of the two distances calculated is returned from each perspective.

One challenge relating to the application of a machine learning algorithm, such as A*, to migration plan generation relates to memory consumption of the algorithm. A list of potential novel states that are still to be considered can be retained, along with states known to be encountered previously along with a measure of their fitness, which is composed of optimal computed the cost of entering that state in addition to the heuristic estimation of distance from that state to the goal state. Since each iteration of the A* algorithm expands valid states into subsequent valid states, there is a branch out effect that is governed by the number of valid states that can be generated from any given state. For example, when A* is applied to simple two-dimensional chessboard style environments where valid moves are one position in any direction implies that given state (some position on the board) has a maximum of 8 possible reachable states (North, South, East, West and the four diagonal positions assuming diagonal moves are valid state transitions). A branching factor of 8, or 4 in the case where non-diagonal moves are barred, is a low branch out factor. Combined with relatively small board sizes this approach is proven to be effective in path finding, and has found success in a variety of grid environments.

However, the application of A* to VM placement is different in a number of ways. A state can be considered as some mapping of virtual machines to hosts. A valid state transition is the application of any valid VM migration to some other host. Parallel moves may also be considered as valid transitions. The upper bound on the branching factor for sequential migration can be expressed as (M*(N−1)), where M is the number of virtual machines, and N is the number of hosts (note that N−1 is the upper bound because migration of a VM to the host it is already present on is not permitted). Since memory allocation of A* is typically governed by the branching factor and the depth of the search, memory consumption can be an issue if branching is unbounded. Using memory consumption bounding paired with decisions for single movement state transitions, the selection of heuristics that preemptively prune paths from the search space enables reduced memory overhead. This approach was thereby made suitable for execution on a class of hardware that is generally available in data centers which manage large numbers of virtual servers and hosts.

Figure 6:
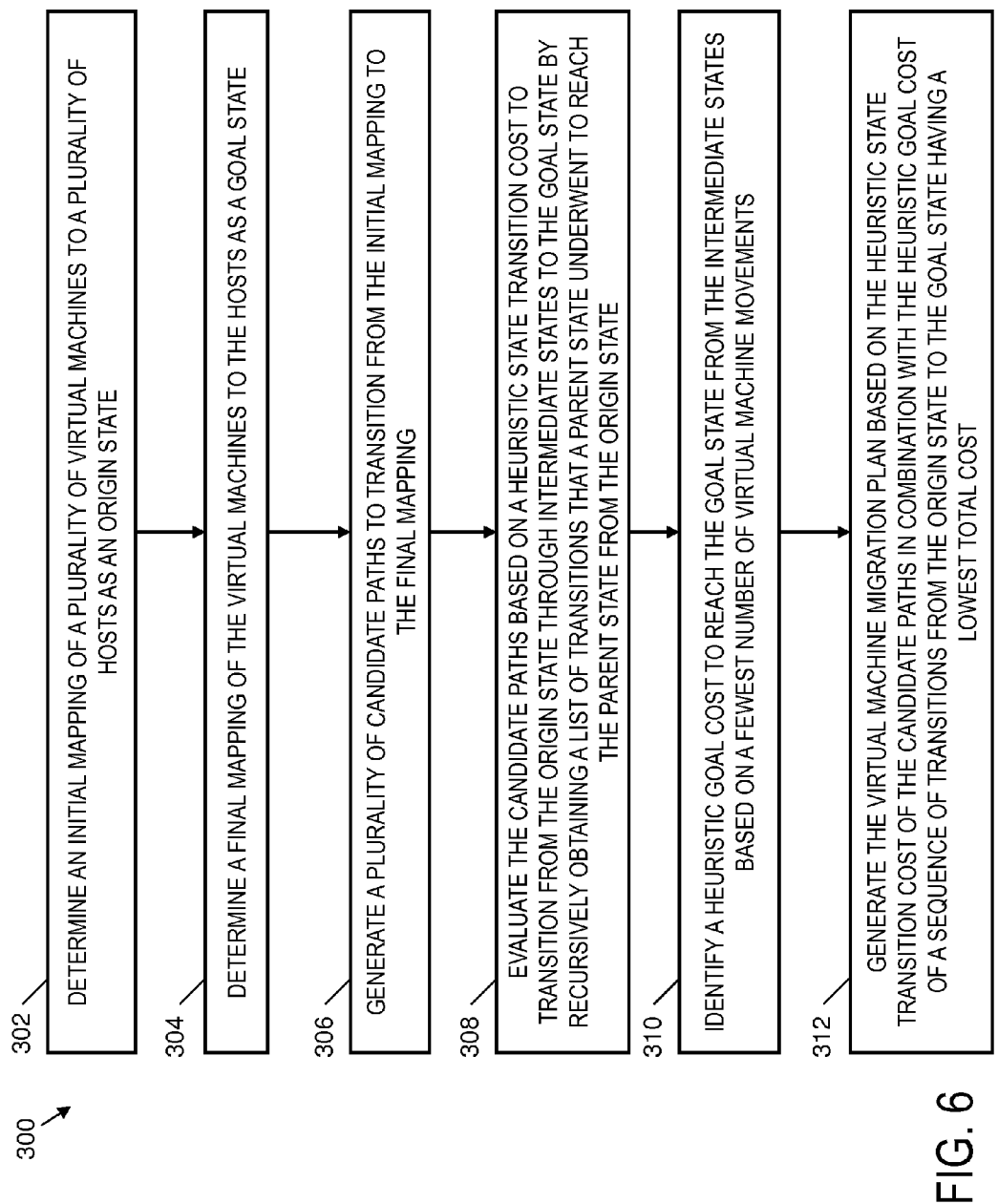
FIG. 6 depicts a flow diagram of a process for generating a virtual machine migration plan according to an embodiment.

FIG. 6 depicts a flow diagram of a process 300 for generating a virtual machine migration plan according to an embodiment. The process 300 can be implemented by the virtual machine allocation application 76 of FIG. 3. At block 302, an initial mapping of a plurality of virtual machines to a plurality of hosts is determined as an origin state, e.g., origin state 202 of FIG. 5. The origin state may simply be the current state of mappings between VMs and hosts in the system.

At block 304, a final mapping of the virtual machines to the hosts is determined as a goal state, e.g., goal state 204 of FIG. 5. Any known method of generating a goal state may be used to determine the goal state, such as load balancing, resource consolidation, and the like.

At block 306, a plurality of candidate paths is generated to transition from the initial mapping to the final mapping. The candidate paths include possible intermediate states that sequentially lead between the origin state and goal state.

At block 308, the candidate paths are evaluated based on a heuristic state transition cost to transition from state-to-state from the origin state through a plurality of intermediate states to the goal state by recursively obtaining a list of transitions that a parent state underwent to reach the parent state from the origin state. The heuristic state transition cost can be based on a fixed cost assigned to each one of a plurality of enumerated transition types. As previously described, the enumerated transition types may include: a partial transition type that places at least one but not all of the virtual machines onto at least one of the hosts according the goal state; an endgame transition type that fully satisfies the goal state; a countermovement transition type that takes away at least one of the virtual machines from a targeted host of the goal state; a cycle transition type that moves at least one of the virtual machines back onto a previous host; and a random transition type that shuffles locations of one or more of the virtual machines.

At block 310, a heuristic goal cost to reach the goal state from the intermediate states is identified based on a fewest number of virtual machine movements. In one embodiment, a mapping data structure is formed for each of the initial mapping and the final mapping, and the heuristic goal cost is computed based on assignment of a distance between the origin state and the goal state on a per host basis using the mapping data structures. Iterating over each of the hosts may be performed to compute a number of virtual machines present in one state but absent in another state moving from the origin state towards the goal state and from the goal state towards the origin state.

At block 312, a virtual machine migration plan is generated based on the heuristic state transition cost of the candidate paths in combination with the heuristic goal cost of a sequence of transitions from the origin state to the goal state having a lowest total cost.

At data center scale, it is typically impractical to perform migrations in a purely serial fashion, as the time to convergence can potentially take too long to be viable. Here, the term "convergence" refers to the time required to go from an initial VM-to-host allocation to a targeted allocation (e.g., consolidated, load-balanced, etc. . . . ). Potentially long convergence times may arise when dynamic placement actions happen frequently, when there are frequent changes in the number of actively managed VMs in the cloud infrastructure, or even when the hardware underlying the cloud infrastructure is highly variable.

In general, migration time is affected by the memory allocation of the virtual machine, the disk size of the virtual machine if persistent disk storage is to be migrated, and the rate of page dirtying which occurs in the VM under migration. Migration performance speed-up may be achieved when remote direct memory access (RDMA) is leveraged as the transport mechanism for VM memory. In order to use RDMA for VM migration, hypervisors need access to RDMA based network interface adapters, and RDMA support is needed on interconnecting switches between source and destination hypervisors.

In one embodiment, a migration plan can be parallelized by generating a sequential path as output by a memory-bounded A* machine learning implementation with the aforementioned heuristics. The sequential migration plan is then post processed to seek opportunities for parallelization. This architectural approach cleanly separates the original path computation and the parallel approach. Separation between serial generation and parallelization enables application of alternate parallelization algorithms, if desired.

Figure 7:
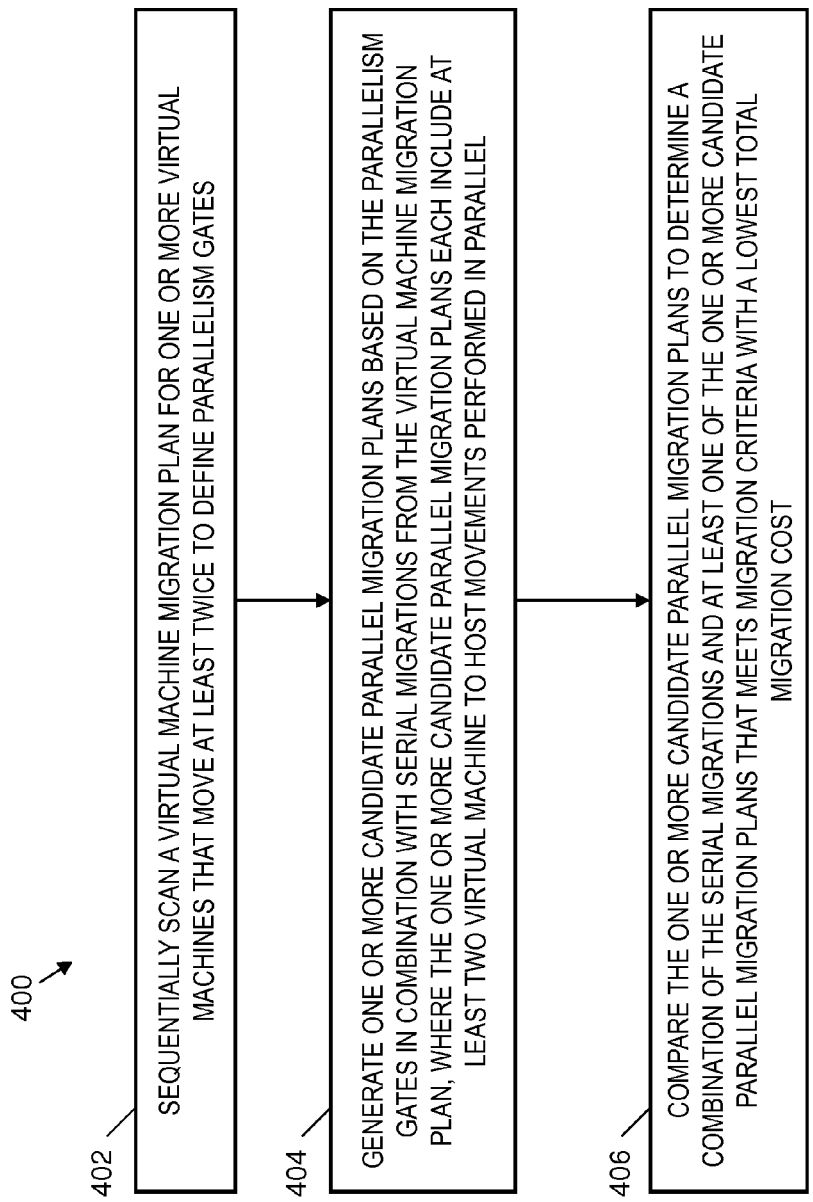
FIG. 7 depicts a flow diagram of a process for including parallelism when generating a virtual machine migration plan according to an embodiment.

FIG. 7 depicts a flow diagram of a process 400 for including parallelism when generating a virtual machine migration plan according to an embodiment. Looping can be performed over each serial migration from the list of migrations comprising the serial migration plan. At block 402, sequential scanning is performed for VMs which have been encountered already in the VM migration plan. If a VM is encountered which is moved twice in the same plan, the sequential plan can be split just before the second move of the twice-moved VM. This effort is to account for VM-gated parallelism, where VMs that move at least twice define parallelism gates. The machine learning algorithm indicates that if a VM was moved twice, it must have been moved twice serially; otherwise, the algorithm would have skipped the intermediate step and migrated the VM directly to the ultimate destination. This is accounted for by the fact that during the generation of candidate moves, both the intermediate and ultimate destination would have been considered. The serial moves processed in a current iteration are added into a candidate parallel plan to be executed concurrently. Processing of the original serial list continues in the same fashion until the serial migrations are split into candidate parallel migration plans which, by construction, are not gated on repeated VM moves. Thus, the virtual machine allocation application 76 of FIG. 3 may perform sequentially scanning of the virtual machine migration plan for one or more virtual machines that move at least twice to define parallelism gates.

At block 404, one or more candidate parallel migration plans are generated based on the parallelism gates in combination with serial migrations from the virtual machine migration plan. The one or more candidate parallel migration plans each including at least two VM to host movements performed in parallel. At block 406, the one or more candidate parallel migration plans are compared to determine a combination of the serial migrations and at least one of the one or more candidate parallel migration plans that meets migration criteria with a lowest total migration cost.

A tentative list of candidate parallel migrations is processed to handle host-based gates to parallelism. The processing can include an optional cap on the maximum number of outbound migrations allowed from any individual hypervisor instance, as well as a maximum outbound migration threshold. Within each candidate parallel plan, scanning is performed for repeated hosts to ensure that capacities are not over-subscribed beyond per-resource, configurable, over-commit ratios.

The number of inbound and outbound migrations can be tracked for any given host from a candidate parallel migration to ensure over-saturation is avoided on the network or an individual host with bulk parallel migrations. Migration criteria with a lowest total migration cost can be defined according to one or more thresholds. For example, a threshold may be used for maximum parallel inbound migrations, outbound migrations, and cumulative migrations on a per-host level for maximum control in addition to a network-wide limit on the maximum size of a parallel migration. The values selected for these parameters can be obtained through some experimentation on various networks (e.g., ranging from 1 GB/sec to 10 GB/sec). The appropriate values are highly dependent on the network topology and throughput and may not be useful in all instances. For instance, RDMA-based transfers may enable massively concurrent migration plans, allowing much faster convergence. In another example, consider that infrastructures with dedicated migration NICs and isolated migration networks with reserved bandwidth can perform more than comparable environment sharing business traffic over the migration network. Likewise, 10 GB migration networks will saturate after 1 GB networks will. Other schemes involving quality of service (QOS) priority of VM migration traffic can also impact ideal values.

Technical effects include determining an efficient VM migration plan on a plurality of host systems. Reaching a goal state of VM to host mapping efficiently reduces network resource consumption and processing time dedicated to overhead tasks associated with VM migration. Rapid convergence on a sequence of transition states to change the VM-to-host mapping of system can also reduce the latency between determining a migration plan and completing the migration plan such that a goal state is readily achieved with less delay.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for generating a virtual machine migration plan, the method comprising:
    determining an initial mapping of a plurality of virtual machines to a plurality of hosts as an origin state;
    determining a final mapping of the virtual machines to the hosts as a goal state;
    generating a plurality of candidate paths to transition from the initial mapping to the final mapping;
    evaluating the candidate paths based on a heuristic state transition cost to transition from state-to-state from the origin state through a plurality of intermediate states to the goal state by recursively obtaining a list of transitions that a parent state underwent to reach the parent state from the origin state, wherein the heuristic state transition cost is based on a fixed cost assigned to each one of a plurality of enumerated transition types comprising: a partial transition type that places at least one but not all of the virtual machines onto at least one of the hosts according to the goal state, an endgame transition type that fully satisfies the goal state, a counter movement transition type that takes away at least one of the virtual machines from a targeted host of the goal state, a cycle transition type that moves at least one of the virtual machines back onto a previous host, and a random transition type that shuffles locations of one or more of the virtual machines;
    identifying a heuristic goal cost to reach the goal state from the intermediate states based on a fewest number of virtual machine movements; and
    generating the virtual machine migration plan based on the heuristic state transition cost of the candidate paths in combination with the heuristic goal cost of a sequence of transitions from the origin state to the goal state having a lowest total cost.

2. The method of claim 1, further comprising:
    forming a mapping data structure for each of the initial mapping and the final mapping; and
    computing the heuristic goal cost based on assignment of a distance between the origin state and the goal state on a per host basis using the mapping data structures.

3. The method of claim 2, further comprising iterating over each of the hosts to compute a number of virtual machines present in one state but absent in another state moving from the origin state towards the goal state and from the goal state towards the origin state.

4. The method of claim 1, wherein the virtual machine movements are performed using remote direct memory access.

5. The method of claim 1, further comprising:
    analyzing a sequential migration plan in the virtual machine migration plan to redefine one or more portions of the virtual machine migration plan as parallel migrations.

6. The method of claim 5, further comprising:
    sequentially scanning the virtual machine migration plan for one or more virtual machines that move at least twice to define parallelism gates;
    generating one or more candidate parallel migration plans based on the parallelism gates in combination with serial migrations from the virtual machine migration plan, the one or more candidate parallel migration plans each including at least two virtual machine to host movements performed in parallel; and
    comparing the one or more candidate parallel migration plans to determine a combination of the serial migrations and at least one of the one or more candidate parallel migration plans that meets migration criteria with a lowest total migration cost.

7. The method of claim 6, wherein generating the one or more candidate parallel migration plans further comprises capping one or more of: a maximum number of parallel inbound migrations, a maximum number of outbound migrations, and a number of cumulative migrations.

8. The method of claim 7, wherein the capping one or more of: the maximum number of parallel inbound migrations, the maximum number of outbound migrations, and the number of cumulative migrations is performed on a per-host level.

9. The method of claim 8, wherein generating the one or more candidate parallel migration plans further comprises applying a network-wide limit on a maximum size of parallel migration across the hosts.

10. A method for generating a virtual machine migration plan, the method comprising:
   determining an initial mapping of a plurality of virtual machines to a plurality of hosts as an origin state;
   determining a final mapping of the virtual machines to the hosts as a goal state;
   generating a plurality of candidate paths to transition from the initial mapping to the final mapping;
   evaluating the candidate paths based on a heuristic state transition cost to transition from state-to-state from the origin state through a plurality of intermediate states to the goal state by recursively obtaining a list of transitions that a parent state underwent to reach the parent state from the origin state;
   identifying a heuristic goal cost to reach the goal state from the intermediate states based on a fewest number of virtual machine movements;
   generating the virtual machine migration plan based on the heuristic state transition cost of the candidate paths in combination with the heuristic goal cost of a sequence of transitions from the origin state to the goal state having a lowest total cost;
   analyzing a sequential migration plan in the virtual machine migration plan to redefine one or more portions of the virtual machine migration plan as parallel migrations;
   sequentially scanning the virtual machine migration plan for one or more virtual machines that move at least twice to define parallelism gates;
   generating one or more candidate parallel migration plans based on the parallelism gates in combination with serial migrations from the virtual machine migration plan, the one or more candidate parallel migration plans each including at least two virtual machine to host movements performed in parallel; and
   comparing the one or more candidate parallel migration plans to determine a combination of the serial migrations and at least one of the one or more candidate parallel migration plans that meets migration criteria with a lowest total migration cost.

11. The method of claim 10, wherein the heuristic state transition cost is based on a fixed cost assigned to each one of a plurality of enumerated transition types.

12. The method of claim 10, further comprising:
   forming a mapping data structure for each of the initial mapping and the final mapping; and
   computing the heuristic goal cost based on assignment of a distance between the origin state and the goal state on a per host basis using the mapping data structures.

13. The method of claim 12, further comprising iterating over each of the hosts to compute a number of virtual machines present in one state but absent in another state moving from the origin state towards the goal state and from the goal state towards the origin state.

14. The method of claim 10, wherein the virtual machine movements are performed using remote direct memory access.

15. The method of claim 10, wherein generating the one or more candidate parallel migration plans further comprises capping one or more of: a maximum number of parallel inbound migrations, a maximum number of outbound migrations, and a number of cumulative migrations.

16. The method of claim 15, wherein the capping one or more of: the maximum number of parallel inbound migrations, the maximum number of outbound migrations, and the number of cumulative migrations is performed on a per-host level.

17. The method of claim 16, wherein generating the one or more candidate parallel migration plans further comprises applying a network-wide limit on a maximum size of parallel migration across the hosts.

* * * * *